US012689665B2

(12) United States Patent
Lower et al.

(10) Patent No.: US 12,689,665 B2
(45) Date of Patent: Jul. 21, 2026

(54) INDEX STRUCTURE AND CARD NETWORK SYSTEM FOR CROSS BORDER REAL-TIME PAYMENTS

(71) Applicant: MASTERCARD ASIA/PACIFIC PTE. LTD., Singapore (TH)

(72) Inventors: Richard Lower, Muang (TH); Sandeep Gelli, Singapore (IN); Sandeep Sirdesai, Singapore (IN)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 59 days.

(21) Appl. No.: 18/961,294

(22) Filed: Nov. 26, 2024

(65) Prior Publication Data

US 2026/0149742 A1 May 28, 2026

(51) Int. Cl.
*H04L 65/401* (2022.01)
*G06Q 20/10* (2012.01)
*G06Q 20/40* (2012.01)

(52) U.S. Cl.
CPC .......... *H04L 65/401* (2022.05); *G06Q 20/10* (2013.01); *G06Q 20/401* (2013.01)

(58) Field of Classification Search
CPC ..... H04L 65/401; G06Q 20/10; G06Q 20/401
See application file for complete search history.

(56) References Cited

U.S. PATENT DOCUMENTS

| | | | | |
|---|---|---|---|---|
| 11,514,412 | B2 * | 11/2022 | Johnston | G06Q 20/381 |
| 11,775,977 | B1 * | 10/2023 | Kruse | G06Q 20/4016 705/40 |
| 2009/0271276 | A1 * | 10/2009 | Roberts | G07F 7/1008 705/16 |
| 2018/0308070 | A1 * | 10/2018 | Raina | G06Q 20/10 |
| 2021/0201302 | A1 * | 7/2021 | Honigberg | G06Q 20/108 |

* cited by examiner

*Primary Examiner* — Viet D Vu
(74) *Attorney, Agent, or Firm* — Pillsbury Winthrop Shaw Pittman LLP

(57) ABSTRACT

A card network system having an index structure is disclosed for routing cross-border real-time payment communications between domestic RTP systems. The card network system is configured to create a data record in the index structure for a first participating domestic RTP system, where the first participating domestic RTP system associated with a first country, and assign a first PAN to the first participating domestic RTP system, such that other participating domestic RTP systems can send cross-border payment communications to the first participating domestic RTP system through the card network system by obtaining the first PAN from the index structure and using the first PAN in their cross-border communications.

17 Claims, 6 Drawing Sheets

100

105    115    110

120    125

| RTPs | Credit PAN |
|---|---|
| RTP Country 1 | 10000000000000000 |
| RTP Country 2 | 20000000000000000 |
| RTP Country 3 | 30000000000000000 |

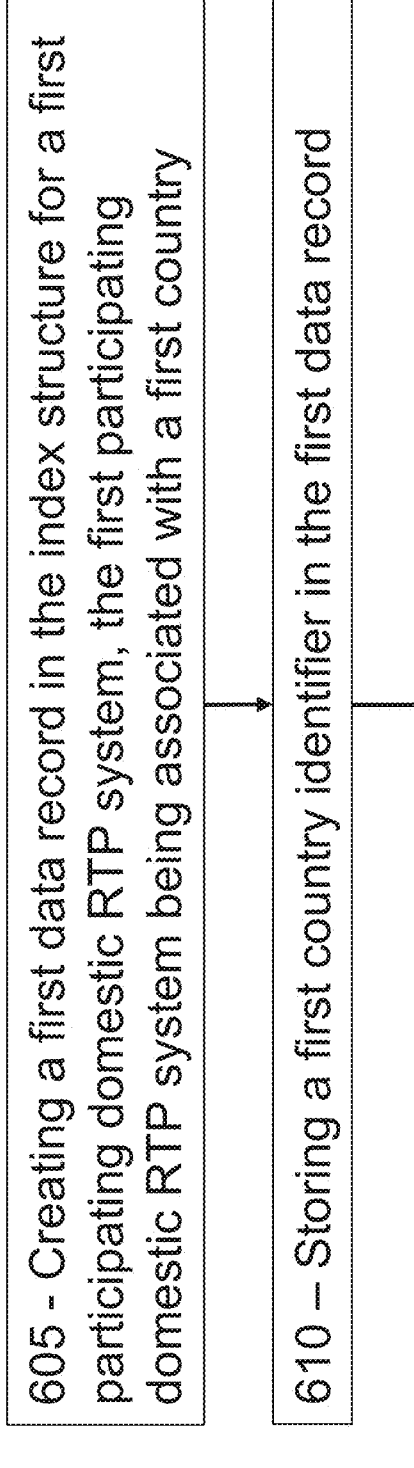

605 – Creating a first data record in the index structure for a first participating domestic RTP system, the first participating domestic RTP system being associated with a first country 610 – Storing a first country identifier in the first data record 615 – Assigning a first primary account number (PAN) to the first participating domestic RTP system in the first data record 620 – Publishing the first country identifier to allow other participating domestic RTP systems to select the first country for an international real-time payment, wherein selection of the first country identifies the first PAN

INDEX STRUCTURE AND CARD NETWORK SYSTEM FOR CROSS BORDER REAL-TIME PAYMENTS

FIELD OF THE INVENTION

The disclosure relates to cross border or international real-time payments (RTPs), and specifically to a card network system comprising an index structure of primary account numbers for participating RTP entities.

BACKGROUND

In known transaction systems, a settlement process (which is the transfer of money between financial institutions/banking entities) occurs in a sequential manner, where funds intended for a payment transaction are moved through a payment pathway after which a clearing process is performed by the recipient beneficiary bank to assess whether the payment instruction can be completed. This can sometimes result in the beneficiary bank holding funds to which it is not entitled (due to a failure in the clearing process) and for which there are, in many cases, no laws or commercial agreements that describe a speedy resolution process. As a result, it may take a day or more for payment transactions to eventually be credited to the intended beneficiary or for the payment funds to be returned to the sender, or, rarely, the funds may go missing.

In another known system the settlement process may involve an originating bank and a receiving bank, and where cross-border payment communications are sent to a computing device to process communications into different formats as required by particular standards or protocols.

Each domestic real-time payment, RTP, system (where the RTP system is associated with, and operate within, a particular country) has their own specific requirements and message types that cannot ordinarily communicate directly with domestic RTP systems of other countries. The present disclosure is directed to an improved, scalable transaction system and method, which can allow cross-border real-time payment transactions.

SUMMARY

The scope of the disclosure is set out in the appended claims.

In a first aspect of the present disclosure, there is provided a computer-implemented method for constructing an index structure for a card network system for international real-time payments, RTPs, between differing domestic RTP systems, the method performed by the card network system and comprising the steps of: creating a first data record in the index structure for a first participating domestic RTP system, wherein the first participating domestic RTP system is associated with a first country; storing a first country identifier in the first data record; assigning a first primary account number (PAN) to the first participating domestic RTP system in the first data record; and publishing the first country identifier to allow other participating domestic RTP systems to select the first country to make an international real-time payment, wherein selection of the first country identifies the first PAN.

In this way, an index structure can be created for a card network system that allows payment transactions between two domestic RTP systems of differing countries as international real-time payments. In other words, the card network system of the present disclosure acts as a gateway between the two domestic RTP systems and can be configured to support payment request and credit transfer request messages between the two domestic RTP systems.

More than one participating domestic RTP systems may be associated with a same country. For example, there may be two or three domestic RTP systems associated with the first country. As such, the method may comprise assigning another PAN to another participating domestic RTP system in another data record, where the another participating domestic RTP system is associated with the first country. In the case where there are more than one participating RTP systems associated with a same country, each of the participating RTP systems would be assigned a different PAN. If a particular country has more than one participating RTP systems, each participating RTP system may include a specific RTP identifier to identify the participating RTP system from the other participating RTP systems.

A first sending domestic RTP system in a first country is able to select a recipient domestic RTP system from the index structure of the card network system based on a country identifier in order to transfer credit from an account in the country of the first sending domestic RTP system to an account in the country of the recipient domestic RTP system. In selecting a recipient country, the card network system provides the first domestic RTP system a primary account number (PAN) that has been allocated to a second domestic RTP system associated with the recipient country. To put it in another way, the present card network system will route payment/fund transfer messages to a particular domestic RTP system based on the PAN. The PAN may be a static card number (in other words a static PAN), such as a sixteen digit card number that is used by the first sending domestic RTP system to allow the payment/credit messages to be routed from the first domestic RTP system to the second recipient domestic RTP system through the card network system. The second domestic RTP system, on receiving the payment request or credit transfer message from the card network system, is then able to further direct the received payment request or credit transfer message to the recipient and/or a recipient banking entity.

As will be appreciated, payment communication messages such as payment verifications, payment and/or credit transfer requests, error messages, and settlements can be performed across the card network system of the present disclosure. Domestic RTP systems typically use standards, such as ISO 20022, to send RTP payment communication messages, and card networks use the ISO 8583 standard. Translations between these two standard formats may be used as the payment communications are routed from the first domestic RTP system to the card network system and further to the second domestic RTP system. As an example, the card network system may use single message 0200/0210 (according to ISO 8583) to align with pacs.008/pacs.002 RTP messages (according to ISO 20022 or another agreed message type). In known systems, cross border/international payments are not performed directly across a card network system but instead may use a computing device indirectly supports communications between domestic RTP systems. In other known methods, international payments use networks such as a SWIFT network, which is not a real-time payment network and may require several days for a payment to be settled.

The present disclosure advantageously enables international real-time payments by allocating a PAN to each participating domestic RTP system and acting as the gateway through which payment communications can be routed between domestic RTP systems. Payment data is therefore communicated faster across the network, improving the data integrity in each RTP system. The index structure is also scalable, allowing for quick and efficient data exchange between any number of domestic RTP systems.

In a second aspect of the present disclosure, there is provided a card network system configured to construct an index structure for international real-time payments, RTPs, between differing domestic RTP systems, the card network system configured to: create a first data record in the index structure for a first participating domestic RTP system, wherein the first participating domestic RTP system is associated with a first country; store a first country identifier in the first data record; assign a first primary account number (PAN) to the first participating domestic RTP system in the first data record; and publish the first country identifier to allow other participating domestic RTP systems to select the first country to make an international real-time payment, wherein selection of the first country identifies the first PAN, wherein the index structure comprises respective data records for each of the other participating domestic RTP systems, wherein each of the other participating domestic RTP systems is associated with other countries respectively, and wherein each of the other participating domestic RTP systems has a respective country identifier and a respective PAN stored in their respective data record. Preferably, the card network system is further configured for an international real-time payment between a first domestic RTP system associated with a first country to a second domestic RTP system associated with a second country, wherein the first domestic RTP system and the second domestic RTP system are each participating domestic RTP systems in the card network system, wherein the card network system is configured to: receive a payment request verification message from the first domestic RTP system to verify the account of the second user of the second domestic RTP system, wherein the payment request verification message comprises a PAN of the second domestic RTP system and a first identifier of the account of a first user of the first domestic RTP system and a second identifier of the account of the second user; send the payment request verification message to the second domestic RTP system; receive a payment request response message from the second domestic RTP system, wherein the payment request response message comprises an indication to confirm whether the user account of the second domestic RTP system has been successfully verified or not; and send the payment request response message to the first domestic RTP system.

In this way, the card network system can route the payment request verification message and the payment request response message between a paying/sending (first) domestic RTP system and a receiving (second) domestic RTP system based on the PAN of the second domestic RTP system provided in the payment request verification message. Preferably, the payment request verification message also comprises the PAN of the first domestic RTP system for the PAN of the first domestic RTP system to be included in the payment request response message. In this way, the payment request response message, sent from the second domestic RTP system, can be effectively routed back to the first domestic RTP system through the card network system. The payment request response message may comprise a PAN of the first domestic RTP system and the first identifier of the account of the first user of the first domestic RTP system and the second identifier of the account of the second user.

Alternatively, the payment request response message may comprise a linking identifier which links the payment request response message to the payment request verification message and allow the card network system to route the payment request response message back to the first domestic RTP system based on the linking identifier.

It should be understood that the first identifier of the account of the first user of the first domestic RTP system and the second identifier of the account of the second user of the second domestic RTP system ensures that the actual source and destination accounts can be provided in the payment request or credit transfer messages and identified by the receiving entity. These identifiers may be provided in one or more separate fields in the card network message. The identification of a sender and a receiver may also be a regulatory requirement for anti-money laundering purposes.

Preferably, the card network system is further configured to: receive a credit transfer request message from the first domestic RTP system, wherein the credit transfer request message comprises the PAN of the second domestic RTP system and the first identifier of the account of the first user and the second identifier of the account of the second user; send the credit transfer request message to the second domestic RTP system; receive a credit transfer response message from the second domestic RTP system, wherein the credit transfer response message comprises an indication to confirm whether the user account of the second domestic RTP system has been successfully credited or not; and send the credit transfer response message to the first domestic RTP system.

In this way, the card network system can route the credit transfer request message and the credit transfer response message between a paying/sending (first) domestic RTP system and a receiving (second) domestic RTP system based on the PAN of the second domestic RTP system provided in the credit transfer request message. Preferably, the credit transfer request message also comprises the PAN of the first domestic RTP system for the PAN of the first domestic RTP system to be included in the credit transfer response message. In this way, the credit transfer response message, sent from the second domestic RTP system, can be effectively routed back to the first domestic RTP system through the card network system. The credit transfer response message may comprise a PAN of the first domestic RTP system and the first identifier of the account of the first user of the first domestic RTP system and the second identifier of the account of the second user.

Alternatively, the credit transfer response message may comprise a linking identifier which links the credit transfer response message to the credit transfer request message and allow the card network system to route the credit transfer response message back to the first domestic RTP system based on the linking identifier.

In a third aspect of the present disclosure, there is provided a computer-implemented method configured for an international real-time payment between a first domestic RTP system associated with a first country to a second domestic RTP system associated with a second country, wherein the first domestic RTP system and the second domestic RTP system are each participating domestic RTP systems in the card network system according to the second aspect, the method performed by the first domestic RTP system comprising the steps of: receiving a first request message from an account of a first user of the first domestic RTP system to transfer funds to an account of a second user of a second domestic RTP system; and communicating with the card network system to complete the international real-time payment to the second user of the second domestic RTP system.

Preferably, communicating with the card network system comprises: selecting a primary account number (PAN) of the second domestic RTP system from the index structure of the card network system, wherein selecting the PAN comprises identifying a country associated with the second domestic RTP system; sending a payment request verification message to the card network system to verify the account of the second user of the second domestic RTP system, wherein the payment request verification message comprises the PAN of the second domestic RTP system and a first identifier of the account of the first user and a second identifier of the account of the second user; and receiving a payment request response message from the card network system, wherein the payment request response message comprises a first indication to confirm whether the account of the second user of the second domestic RTP system has been successfully verified or not.

The payment request verification message may comprise the PAN of the first domestic RTP system to allow the second domestic RTP system to include the PAN of the first domestic RTP system in the payment request response message. The payment request response message may comprise a PAN of the first domestic RTP system and the first identifier of the account of the first user of the first domestic RTP system and the second identifier of the account of the second user. Alternatively, the payment request response message may comprise a linking identifier which links the payment request response message to the payment request verification message and allow the card network system to route the payment request response message back to the first domestic RTP system based on the linking identifier.

Preferably, the first domestic RTP system comprises a first banking entity and a first proxy banking entity, wherein the first request message is received at the first banking entity, wherein the first banking entity comprises the account of the first user, and the method further comprises: sending, from the first banking entity, the first request message to the first proxy banking entity, wherein the first proxy banking entity is configured to select the PAN of the second domestic RTP system from the index structure of the card network system, send the payment request verification message to the card network system, receive the payment request response message from the card network system, and send the payment request response message to the first banking entity.

The first proxy banking entity may also be configured to convert the first request message to the payment request verification message. Converting the first request message may comprise translating a first message protocol standard to a second message protocol standard. For example, the first proxy banking entity may be configured to translate the first request message according from an ISO 20022 standard or another agreed message type (e.g. a pacs.008/pacs.002 RTP message) to the payment request verification message according to an ISO 8583 standard (e.g. a 0200/0210 single message).

Preferably, the first proxy banking entity is configured to retrieve exchange rate information for making the international real-time payment; and send the exchange rate information to the first banking entity.

In this way, the present disclosure facilitates settlements in national currencies across the card network system and allows the multi-currency settlement between the domestic RTP systems. The first proxy bank may inform the user of the first banking entity of a payment amount in a currency associated with the second domestic RTP system. The exchange rate information may be provided to the user of the first banking entity before the user instructs the first banking entity to send the credit transfer request message to the first proxy banking entity and onto the second domestic RTP system via the card network system. As will be appreciated, cross border payments may often require a currency exchange from a first local currency (associated with the first domestic RTP system) to a second local currency (associated with the second domestic RTP system). The first proxy banking entity may retrieve the exchange rate information from a Local Settlement Bank (LSB). If the user of the first banking entity proceeds to instruct a credit transfer, the first banking entity may be configured to apply an exchange rate based on the received exchange rate information to determine a payment or credit amount to be deducted from the account of the user and then send a credit transfer request message to the first proxy banking entity. LSBs may be used if the card network system is not performing settlement. This provides an advantage of the present card network system when connecting participating RTP systems. This enables the ability each RTP system to settle in their local currency with the card network system.

Alternatively, the card network system may be configured to retrieve exchange rate information and provide the exchange rate information to the first domestic RTP system (i.e. to the first banking entity and/or the first proxy banking entity).

Preferably, the method further comprises: sending a credit transfer request message to the card network system, wherein the credit transfer request message comprises the PAN of the second domestic RTP system and the first identifier of the account of the first user and the second identifier of the account of the second user; and receiving a credit transfer response message from the card network system, wherein the credit transfer response message comprises a second indication to confirm whether the user account of the second domestic RTP system has been successfully credited or not.

The credit transfer request message may comprise the PAN of the first domestic RTP system to allow the second domestic RTP system to include the PAN of the first domestic RTP system in the credit transfer response message. The credit transfer response message may comprise a PAN of the first domestic RTP system and the first identifier of the account of the first user of the first domestic RTP system and the second identifier of the account of the second user. Alternatively, the credit transfer response message may comprise a linking identifier which links the credit transfer response message to the credit transfer request message and allow the card network system to route the credit transfer response message back to the first domestic RTP system based on the linking identifier.

Preferably, the method further comprises: sending, from the first banking entity, a credit transfer request message to the first proxy banking entity, wherein the first proxy banking entity is configured to send the credit transfer request message to the card network system, receive the credit transfer response message from the card network system, and send the credit transfer response message to the first banking entity.

Preferably, the method further comprises sending, from the first banking entity, a credit transfer confirmation message to the first user.

In a fourth aspect of the present disclosure, there is provided a computer-implemented method configured for an international real-time payment between a first domestic RTP system associated with a first country to a second domestic RTP system associated with a second country, wherein the first domestic RTP system and the second domestic RTP system are each participating domestic RTP systems in the card network system according to the second aspect, the method performed by the second domestic RTP system comprising the steps of: receiving one or more messages from the first domestic RTP system via the card network system; and communicating with the card network system to complete the international real-time payment to the second user of the second domestic RTP system.

Preferably, the method further comprises: receiving a payment request verification message from the card network system, wherein the payment request verification message comprises a primary account number (PAN) of the second domestic RTP system and a first identifier of the account of a first user of the first domestic RTP system and a second identifier of the account of a second user of the second domestic RTP system; verifying the account of the second user of the second domestic RTP system; and sending a payment request response message to the card network system, wherein the payment request response message comprises a first indication to confirm whether the account of the second user of the second domestic RTP system has been successfully verified or not.

In this way, the second domestic RTP is able to receive and verify the payment request verification message received from the first domestic RTP system via the card network system. As explained previously, the payment request verification message may further comprise a PAN of the first domestic RTP system and/or a linking identifier for the second domestic RTP system to include in the payment request response message that is sent back to the first domestic RTP system via the card network system. The second domestic RTP system may verify the account of the second user of the second domestic RTP system by checking whether the account is configured to receive payment/credit. For example, if the account of the second user is unavailable or closed and cannot receive payment, the second domestic RTP system will send a payment request response message to indicate that the account of the second user has not been successfully verified for payment.

Preferably, the second domestic RTP system comprises a second banking entity and a second proxy banking entity, wherein the payment request verification message is received at the second proxy banking entity, and the method further comprises: sending, from the second proxy banking entity, the payment request verification message to the second banking entity, wherein the second banking entity comprises the account of the second user, wherein the second banking entity is configured to verify the account of the second user and send the payment request response message to the second proxy banking entity.

The second proxy banking entity may receive the credit transfer request message in a particular format (e.g. a 0200 message) and be configured to convert the credit transfer request message into another format for the second banking entity (e.g. into a pacs.008 message or another agreed message type). As such sending the credit transfer request message from the second proxy banking entity to the second banking entity may comprise translating the credit transfer request message from a first message protocol standard to a second message protocol standard (e.g. the second proxy banking entity may be configured to translate the credit transfer request message from 0200/0210 single message according to an ISO 8583 standard to pacs.008/pacs.002 RTP message according to an ISO 20022 standard).

Preferably, the method further comprises: receiving a credit transfer request message from the card network system, wherein the credit transfer request message comprises the PAN of the second domestic RTP system and the first identifier of the account of the first user of the first domestic RTP system and the second identifier of the account of the second user of the second domestic RTP system crediting the account of the second user of the second domestic RTP system; and sending a credit transfer response message to the card network system, wherein the credit transfer response message comprises a second indication to confirm whether the account of the second user of the second domestic RTP system has been successfully credited or not.

Preferably, the method further comprises: sending, from the second proxy banking entity, the credit transfer request message to the second banking entity, wherein the second banking entity is configured to credit the account of the second user and send the credit transfer response message to the second proxy banking entity; and sending, from the second proxy banking entity, the credit transfer response message to the card network system.

In a fifth aspect of the present disclosure, there is provided a non-transitory computer-readable medium storing instructions that are operable when executed by data processing apparatus of a participant in a secure communications system to perform the method of the first, third or fourth aspects.

In addition to the verification and credit transfer messages described above, the domestic RTP systems and/or the card network system of the present disclosure may be configured to terminate a settlement process and stop a payment request verification process or a credit transfer process from proceeding any further. Examples of settlement process terminations include:

Message response timeout, when a receiving entity (such as a proxy banking entity or the card network system, or a banking entity) does not successfully receive a message within a predetermined time period Repeated failed attempts, when a sending entity fails to send a message to a receiving entity for a predetermined number of attempts. Failure to send a message may be due a receiving entity declining to receive a message.

BRIEF DESCRIPTION OF DRAWINGS

Embodiments of the present disclosure are described below, by way of example only, with reference to the accompanying drawings, in which:

FIG. 3 shows an exemplary table of PANs allocated to respective domestic RTP systems according to an embodiment of the present disclosure;

FIG. 6 illustrates a method for constructing a data record and an index structure in a card network system according to an embodiment of the present disclosure.

DETAILED DESCRIPTION

Figure 1:
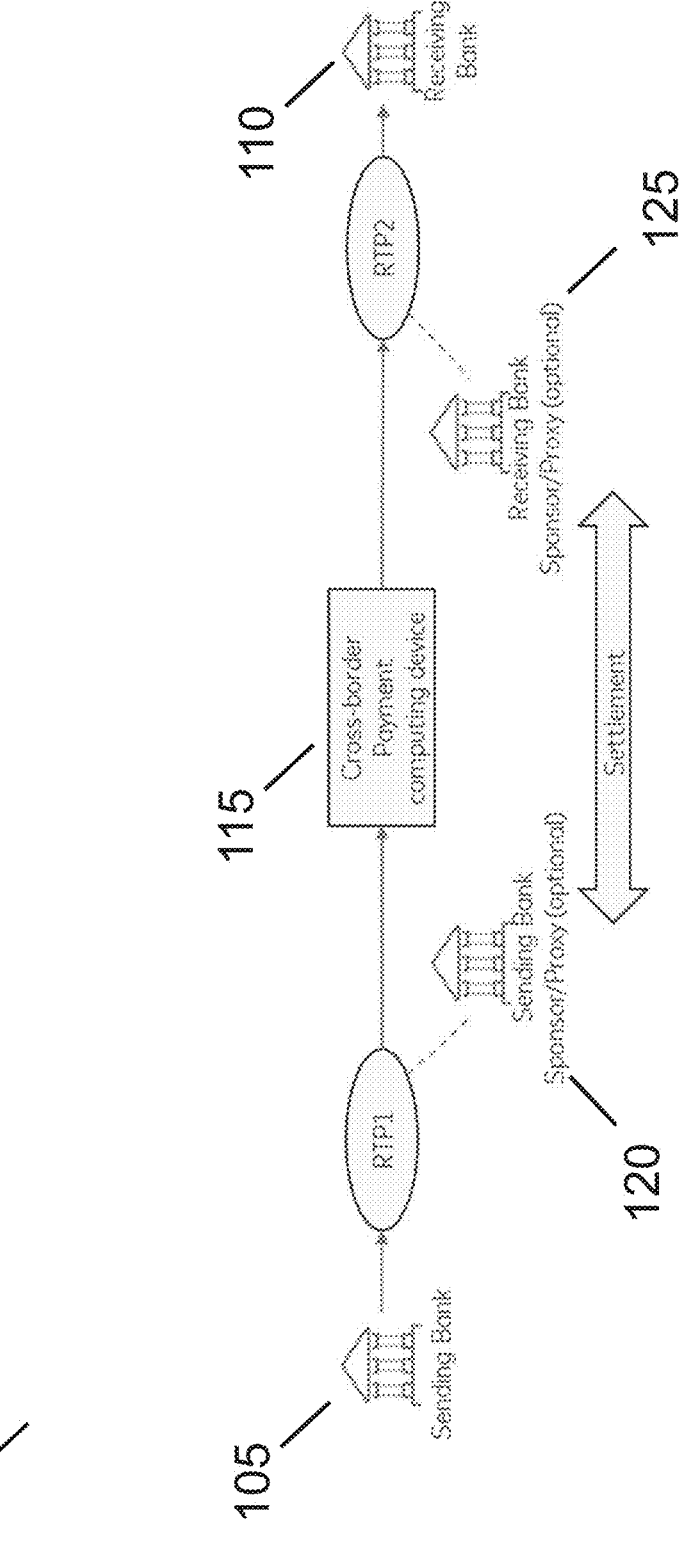
FIG. 1 illustrates in schematic form a known cross-border payment system in the art.

Various aspects of the disclosure are now described with reference to the accompanying drawings. The description and specific examples included herein are intended for purposes of illustration only and are not intended to limit the scope of the present disclosure. The following description is presented to enable any person skilled in the art to make and use the system, and is provided in the context of a particular application. Various modifications to the disclosed embodiments will be readily apparent to those skilled in the art.

As used herein, the followings terms have the following meanings:

A "domestic RTP system" is a system of entities that manages real-time payment and verification communications within a single country. The domestic RTP system may comprise multiple financial institutions or banking entities, such as an "originating institution" and an originating institution proxy.

A "card network system" or "card network" is a network which acts as a gateway to allow domestic RTP systems to perform cross-border/international real-time payments between two different countries. The card network system handles related settlement between participating financial institutions (i.e. financial institutions that are part of the card network system scheme). Responsibilities of the card network system may include:

Providing card numbers or primary account numbers (PANs) for routing purposes between participating financial institutions/banking entities/proxy institutions/domestic RTP systems.

Supporting connection to any number of domestic RTP systems.

Routing credit/fund transfers via Single message (e.g. 0200/0210 message, ISO 8583) for guaranteed settlement.

Providing settlement in local currency of a respective domestic RTP system.

An "originating institution" or an "originating banking entity" manages a user's or consumer's account. The originating institution/banking entity may also manage an App on the user's device that scans QR codes from different domestic schemes. The originating institution/banking entity initiates both an Account Inquiry request, payment request verification message and the QR payment request. The originating institution/banking entity settles via a domestic settlement bank. Responsibilities of the originating institution/banking entity may include:

Providing QR payment App that can read QR codes from domestic schemes.

Receiving exchange rates from the card network system or the originating institution proxy.

Debiting a user's/consumer's account in local currency.

Sending funds intended for the merchant/receiving institution in local currency to the originating institution proxy.

An "originating institution proxy" or "originating proxy banking entity" is a participant of the card network system in the international RTP scheme. The originating institution proxy/proxy banking entity makes settlements with the card network system on behalf of the originating institution/banking entity. Responsibilities for the originating institution proxy/proxy banking entity may include:

Fully supporting messages on both domestic RTP and card network systems and providing translation of payment verification and credit transfer messages between ISO 20022 and ISO 8583 standards.

Receiving funds from the originating institution/banking entity within the domestic RTP system and sending funds to the receiving institution/banking entity cross border via the card network system.

Reconciling transaction activity with the domestic RTP and card network systems.

Obtaining exchange rate information (e.g. from FX API) and sending/making available the exchange rates to the originating institution/banking entity.

A "receiving institution proxy" or "receiving proxy banking entity" is a participant of the card network system in the international RTP scheme. The receiving institution proxy/proxy banking entity converts messages received from the card network system into corresponding messages for the receiving institution/banking entity. Responsibilities for the receiving institution proxy/proxy banking entity may include:

Fully supporting messages on both the domestic RTP and card network systems and provides translation of payment verification and credit transfer messages between ISO 8583 and ISO 20022 standards.

Settling cross-border transfers with the card network system and settling with the receiving institution/banking entity within the domestic RTP system.

Reconciling activity for both domestic RTP system and card network system transactions.

A "receiving institution" or a "receiving banking entity" manages a merchant's account and approves incoming payments. Responsibilities of the receiving institution/receiving banking entity may include:

Checking the merchant account is valid and approving credit transfers within the domestic RTP system.

Notifying the merchant of payments and credits the merchant's account in real-time.

The methods and systems provided herein improve the implementation of international real-time payments by providing a card network system that allocates a static PAN or 16 digit card number to a participating financial institution/banking entity, where the participating banking entity is part of a domestic RTP system in a particular country. The participating banking entity in the card network system is then identifiable/searchable by its country association such that payment verifications and credit transfers from outside the country can be made through the card network system by use of the allocated PAN/card number. Payment communications comprising a PAN for a destination country can then be effectively routed across national borders through the card network system to facilitate international real-time payments.

A payment network can be described as 'real-time' in the case where the processing of a payment transaction takes place 'online' or 'in real time'. That is, the transaction is processed completely (i.e. approved or declined) in real time. Here, real time is not intended to place any definitive time limit on the processing of a transaction, as in practice this will vary according to factors including network connection bandwidth, payment network processing resource and current load. By way of example only, a real-time payment network would typically handle the processing of a transaction in a timeframe of the order of a second, e.g. within 0.5 seconds to 5 seconds.

FIG. 1 shows a known payment communication network system 100 used to perform cross-border payment transactions. The known network system 100 includes an originating or sending bank 105 and a receiving bank 110. In order to make cross-border payments, the sending bank 105 sends payment communications to a computing device 115, where the computing device 115 acts as a gateway between the sending bank 105 and the receiving bank 110. The computing device 115 is configured to support different formats and convert between the different formats as required by particular standards or protocols.

Optionally, the originating/sending bank 105 and the receiving bank 110 may each have their respective sponsor bank or proxy. In other words, the sending bank 105 may have a sending bank proxy 120 and the receiving bank 110 may have a receiving bank proxy 125. Payment communications and settlement may occur between the sending bank proxy 120 and the receiving bank proxy 125.

Figure 2:
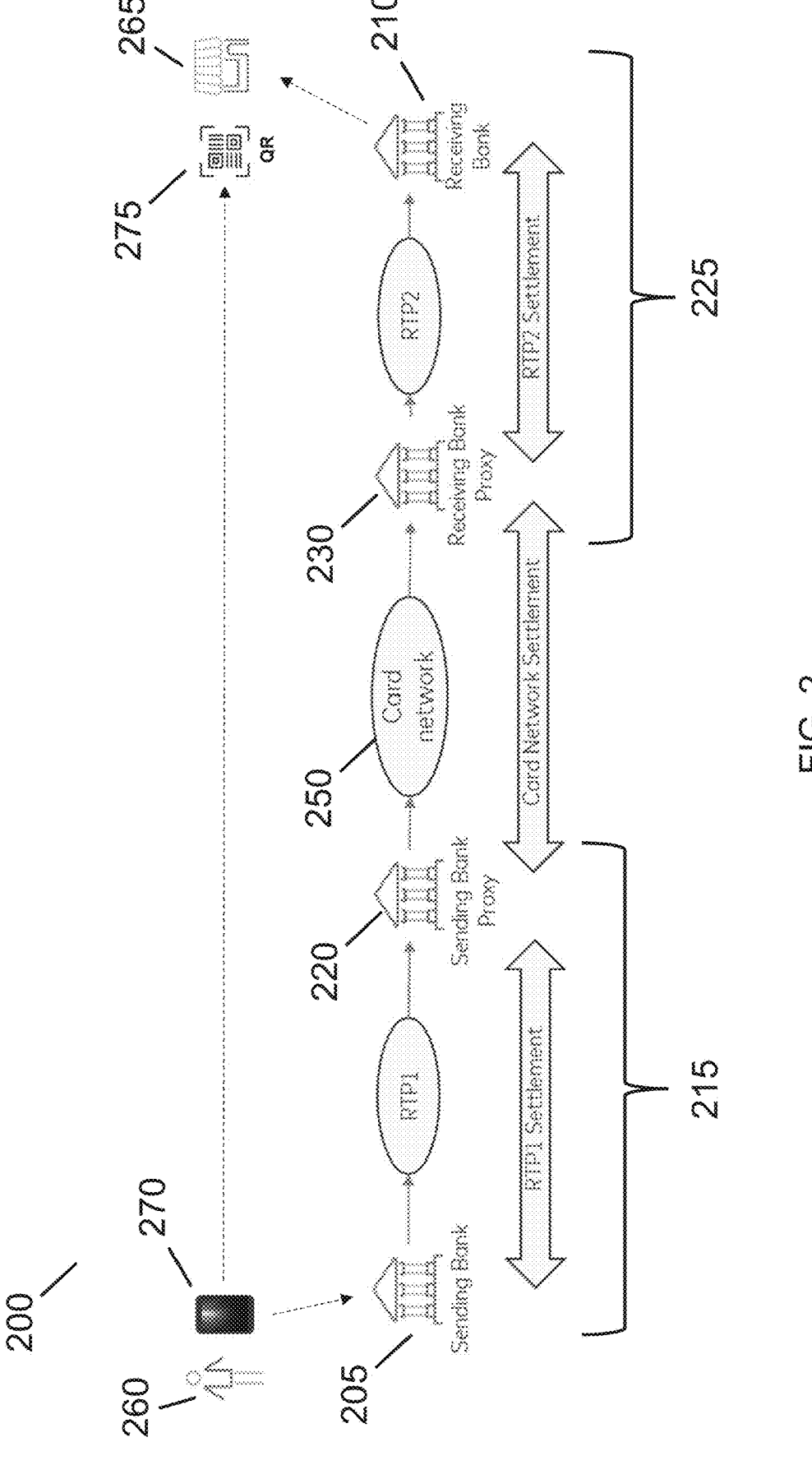
FIG. 2 illustrates in schematic form a cross-border international RTP system according to an embodiment of the present disclosure.

FIG. 2 shows a payment transaction system 200 of the present disclosure for performing international/cross-border real-time payment transactions. The payment transaction system 200 includes a first banking entity 205 which is the originating/sending bank or financial institution and a second banking entity 210 which is the receiving bank or financial institution. The first banking entity 205 is part of a first domestic RTP system 215, which further comprises a first proxy banking entity 220. The first domestic RTP system 215 is provided in a first country and domestic real-time payments and payment communications can take place between the first banking entity 205 and the first proxy banking entity 220 in ways known in the art. The second banking entity 210 is part of a second domestic RTP system 225, which further comprises a second proxy banking entity 230. The second domestic RTP system 225 is provided in a second country, different to the first country, and domestic real-time payments and payment communications also take place between the second banking entity 210 and the second proxy banking entity 230 in known ways.

The system 200 further comprises a card network, or card network system, 250, which is configured to route payment communications between domestic RTP systems which are part of the card network system 250. The first proxy banking entity 220 and the second proxy banking entity 230 are both participating entities in the card network system 250. Each participating banking entity (e.g. the first proxy banking entity 220 and the second proxy banking entity 230) are allocated a primary account number (PAN). For the first proxy banking entity 220 to send a payment communication to the second proxy banking entity 230, the payment communication message must include the PAN of the receiving participating entity (i.e. the PAN of the second proxy banking entity 230). Conversely, for the second proxy banking entity 230 to send a payment communication to the first proxy banking entity 220, the payment communication message must include the PAN of the first proxy banking entity 220. The card network system 250 is configured to route payment communication messages between participating banking entities by use of the allocated PANs for the respective participating banking entities. This use of PANs allows cross-border payment communications and settlement to be performed as an international real-time payment.

It should be appreciated that domestic RTP payment communications within a single country adhere to message protocols that are specific to the single country, according to specific laws, regulations and standards. This means that in known systems, a first proxy banking entity or first sponsor bank cannot directly send or receive payment communications with a second proxy banking entity or second sponsor bank in another country without reformatting of the payment communication messages. In addition, since domestic RTP systems work independently of each other and adhere to different rules and protocols, cross-border payments and communications do not take place effectively.

An example of a flow of the present system 200 is as follows. A user 260 has an account with the first banking entity 205 and wishes to purchase an item from a merchant

265 having an account with the second banking entity 210 in another country. The user 260 uses a user device 270 to scan a QR code 275 of a merchant 265 and sends payment instructions to the first banking entity 205 to make an international real-time payment to the merchant's 265 account. The first banking entity 205 sends payment communication and settlement messages to the first proxy banking entity 220. The first proxy banking entity 220, which is a participating entity of the card network system 250, selects the country of the merchant 265 and retrieves a PAN for the second proxy banking entity 230. The first proxy banking entity 220 is then able to send payment communication and settlement messages to the second proxy banking entity 230 through the card network system 250 by using the PAN of the second proxy banking entity 230. The second proxy banking entity 230 verifies the account of the merchant 265 with the second banking entity 210 and send payment communications and settlement messages received from the first proxy banking entity 220 to the second banking entity 210.

FIG. 3 shows an exemplary table of an index structure 300 of the card network system 250. As explained above, the card network system 250 allocates a PAN to a participating domestic RTP system, where the PAN allows other participating domestic RTP systems to select a particular domestic RTP system for sending payment communications to via the card network system 250. Selecting a PAN of a particular domestic RTP system is based on the country in which the particular domestic RTP system operates such that a sending domestic RTP system is able to access and send cross-border payment communications through the card network system 250.

As an example, a first participating domestic RTP system 305 is Malaysia and is allocated a first PAN of "1000 0000 0000 0000", a second participating domestic RTP system 310 is the Philippines and is allocated a second PAN of "2000 0000 0000 0000", and a third participating domestic RTP system 315 is Singapore and is allocated a third PAN of "3000 0000 0000 0000". For the first participating domestic RTP system 305 to send payment communications to a merchant in the Philippines, the system 305 includes the second PAN 2000 0000 0000 0000 in the payment communications to the card network system 250, such that the card network system 250 routes the payment communications to the second participating domestic RTP system 310.

Figure 4:
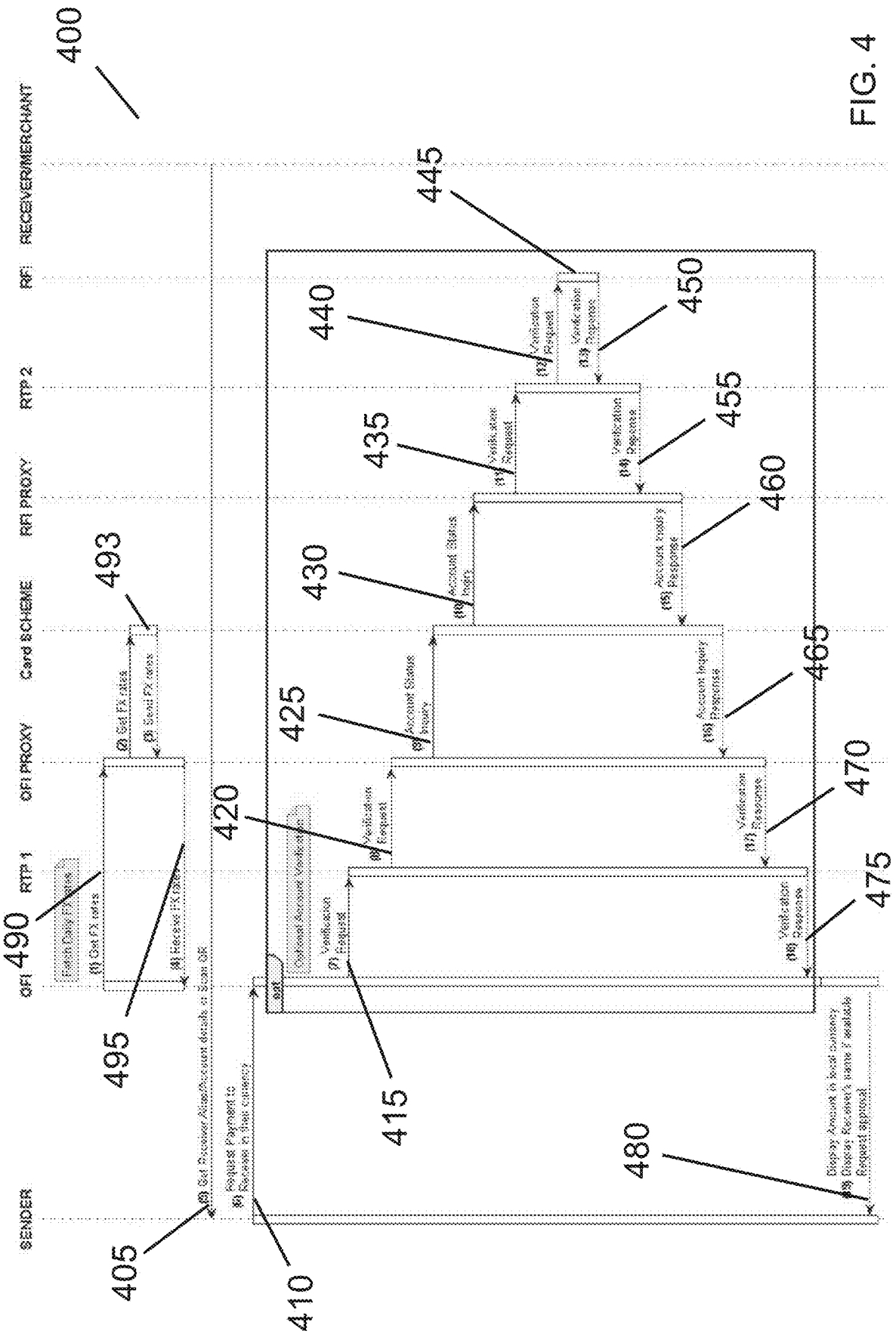
FIG. 4 is a flowchart illustrating a method for performing a cross-border account verification according to an embodiment of the present disclosure.

FIG. 4 is a flowchart illustrating a method 400 for verifying a recipient account to make an international real-time payment according to an embodiment of the present disclosure. Account verification according to method 400 may be an optional process and an international real-time payment to transfer credit may be performed without account verification.

At step 405 a customer (for example, in the Philippines and having a Philippine bank account), wishing to purchase a product, scans a QR code of a merchant using their user device or otherwise obtains account details for a recipient or merchant. The QR code is generated or provided by the merchant for the customer to prepare a payment instruction. For example, the QR code may comprise merchant information, such as an account number of the merchant and a country identifier (Malaysia, in this specific example), and product information, such as a product identifier and a cost for the product.

At step 410 the user device processes the QR code and sends a payment instruction to the originating financial institution/banking entity of the customer (i.e. a Philippine banking entity in which the customer has a user account and is linked to the user device). The payment instruction may also indicate the currency in which the payment is to be made (e.g. in ringgit, the currency of the merchant's country Malaysia).

At step 415 the originating banking entity then prepares and sends a payment request verification message to a first domestic RTP system. The payment request verification message in step 415 may be a pacs.008 message or another agreed message type. At step 420, the first domestic RTP system forwards the pacs.008 message to the originating banking entity proxy (the proxy banking entity). The originating banking entity and the originating financial institution proxy are part of a same first domestic RTP system (i.e. in the Philippines).

At step 425 the originating financial institution proxy/proxy banking entity prepares the payment request verification message for the card network system by converting the pacs.008 message to a single message 0200 according to the ISO 8583 standard and sending the converted message to the card network system. The originating financial institution proxy is also configured to identify the country (Malaysia) associated with the merchant account in the payment instruction.

The originating financial institution proxy/proxy banking entity is a participating entity to a card network system in which participating entities are allocated a primary account number (PAN) and is associated with a particular country. In this example, the originating financial institution has a PAN and is associated with the Philippines. The card network system publishes the PANs of each participating entity in an index structure that is searchable by all of the participating entities.

At step 425, the originating financial institution proxy also selects Malaysia from the index structure of the card network system and is provided a PAN for the receiving financial institution proxy/proxy banking entity (which is also a participating entity of the card network system). The originating financial institution proxy then sends the payment request verification message to the card network system, wherein the payment request verification message comprises the PAN of the receiving financial institution proxy.

At step 430 the card network system routes the payment request verification message to the receiving financial institution proxy based on the PAN of the receiving financial institution proxy in the message.

The receiving financial institution proxy at step 435 then converts the received 0200 single message to a pacs.008 message and sends the message to the second domestic RTP system, which includes the receiver's account/receiving financial institution. At step 440, the second domestic RTP system sends the converted message to the receiving financial institution/banking entity of the merchant. As should be appreciated, the receiving financial institution proxy and the receiving financial institution are part of the same second domestic RTP system (i.e. in Malaysia).

At step 445, the receiving financial institution then verifies the merchant account indicated in the received message and prepares a payment request response message. The payment request response message includes an indication that confirms whether the merchant account has been successfully verified or not. The receiving financial institution then sends the payment request response message back to the second domestic RTP system at step 450. The payment request response message may be a pacs.002 message according to the ISO 20022 standard.

At step 455 the second domestic RTP system forwards the payment request response message to the receiving financial institution proxy. The receiving financial institution proxy then processes and sends the payment request response message to the card network system at step 460. At step 460 the receiving financial institution proxy may convert the pacs.002 message to a single message 0210 according to ISO 8583. At step 465 the card network system routes the payment request response message to the originating financial institution proxy.

As an alternative example, the payment request response message may include a linking identifier to the payment request verification message, which allows the card network system to route the payment request response message back to the originating financial institution proxy. The linking identifier may comprise the PAN of the originating financial institution proxy.

At step 470 the originating financial institution proxy processes the received payment request response message from the card network system and sends the message to the first domestic RTP system. The processing of the message may include converting the 0210 single message to a pacs.002 message. The processing may also comprise including the retrieved exchange rate information in the message to the originating financial institution. The first domestic RTP system then forwards the payment request response message to the originating financial institution at step 475, where the originating financial institution then displays the verification response to the customer at step 480. The response may be a confirmation of a successful verification of the merchant account and display merchant information to the customer. If the verification is unsuccessful the response to the customer will show a failed verification accordingly. In addition to the verification response, the originating financial institution may also display a payable amount to the user, based on an exchange rate conversion using exchange rate information obtained by the originating financial institution as explained below.

The originating financial institution may also instruct the originating financial institution proxy to retrieve exchange rate information (FX rate) for a currency exchange. For instance, the originating financial institution may send a FX rate instruction message at step 490 to the originating financial institution proxy. The FX rate may be a daily FX rate that changes each day. At step 493 the originating financial institution proxy retrieves the FX rate and sends the retrieved FX rate back to the originating financial institution at step 495. As an example, the FX rate may be between Philippine pesos and Malaysian ringgit. In further examples, the originating financial proxy may obtain the FX rates from the card network system, a card scheme or a local settlement bank (LSB).

Figure 5:
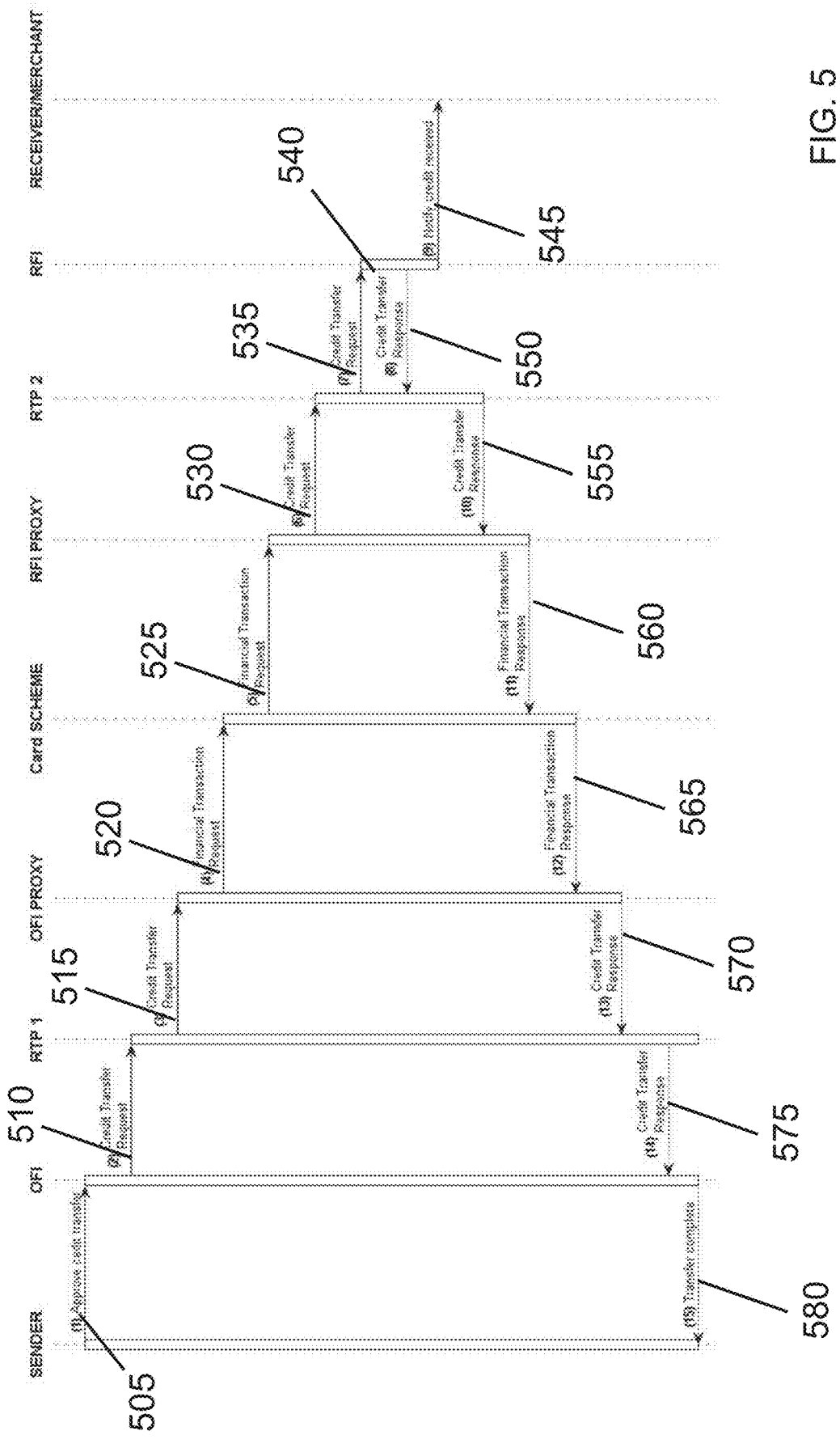
FIG. 5 is a flowchart illustrating a method for making an international real-time payment according to an embodiment of the present disclosure.

FIG. 5 is a flowchart illustrating a method 500 making an international real-time payment according to an embodiment of the present disclosure. As explained above, a credit transfer/payment may optionally be performed after an account verification process.

At step 505 the customer will confirm and instruct the originating financial institution to make a credit transfer. On receipt of the instruction, the originating financial institution then debits the account of the customer and sends a credit transfer request message to the first domestic RTP system at step 510. The message from the originating financial institution may be a pacs.008 message or another agreed message type.

At step 515 the first domestic RTP system forwards the credit transfer request message to the originating financial institution proxy. The originating financial institution proxy then processes the credit transfer request message and sends it to the card network system at 520. In processing the credit transfer request message, the originating financial institution proxy may convert the message from a pacs.008 message to a single message 0200. The originating financial institution proxy also includes the PAN of the receiving financial institution proxy, previously retrieved from the card network system. At step 525 the card network system routes the credit transfer request message to the receiving financial institution proxy based on the PAN of the receiving financial institution proxy in the message.

The receiving financial institution proxy at step 530 validates the credit transfer request, converts the received 0200 simple message to a pacs.008 message and sends the credit transfer request message to the second domestic RTP system.

At step 535, the second domestic RTP system forwards the converted message to the receiving financial institution. At step 540 the receiving financial institution credits the merchant account indicated in the received message and prepares a credit transfer response message. The credit transfer response message includes an indication that confirms whether the merchant account has been successfully credited or not. The receiving financial institution may also notify the merchant of the successful credit transfer at step 545.

The receiving financial institution then sends the credit transfer response message back to the second domestic RTP system at step 550. The payment request response message may be a pacs.002 message according to the ISO 20022 standard.

At step 555 the second domestic RTP system forwards the credit transfer response message to the receiving financial institution proxy. At step 560, the receiving financial institution proxy processes and sends the credit transfer response message to the card network system. In processing the credit transfer response message, the receiving financial institution proxy may convert the pacs.002 message to a single message 0210 according to ISO 8583. At step 565 the card network system then routes the credit transfer response message to the originating financial institution proxy.

As explained above, in an alternative example the credit transfer response message may include a linking identifier to the credit transfer request message, which allows the card network system to route the credit transfer response message back to the originating financial institution proxy. The linking identifier may comprise the PAN of the originating financial institution proxy.

At step 570 the originating financial institution proxy processes the received credit transfer response message from the card network system and sends the message to the first domestic RTP system. The processing of the message may include converting the 0210 single message to a pacs.002 message. Optionally the originating financial institution proxy may also return an acknowledgement message back to the receiving financial institution proxy. The receiving financial institution proxy may also send a confirmation of debit message to a Local Settlement Bank.

At step 575 the first domestic RTP system sends the converted message to the originating financial institution. The originating financial institution then processes the received credit transfer response message at step 580 and displays a credit transfer response to the customer. The response may be a confirmation of a successful credit transfer to the merchant account and display merchant information to the customer. If the credit transfer is unsuccessful the response to the customer will show a failed transfer accordingly.

FIG. 6 sets out a method 600 for constructing a first data record and an index structure in a card network system for making international real-time payments between different domestic RTP systems participating in the card network system.

In step 605 a first data record is created by the card network system for a first participating domestic RTP system. The first participating domestic RTP system is associated with a first country, such as the Philippines or Malaysia for example. As should be understood the index structure comprises a plurality of data records, where each data record is created for a corresponding participating domestic RTP system.

In step 610 the card network system stores an identifier of the first country (i.e. a first country identifier) in the first data record.

In step 615 the card network system assigns a first primary account number (PAN) to the first participating domestic RTP system in the first data record, and in step 620 at least the first country identifier of the first data record is published to allow the first country and the first participating domestic RTP system to be selected for cross-border real time payments to be made into and from the first domestic RTP system. The card network system is configured such that selection of the first country in the first data record reveals or identifies the first PAN for use.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure has been described in terms of various specific embodiments, those skilled in the art will recognize that the disclosure can be practiced with modification within the scope of the claims.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

The invention claimed is:

1. A computer-implemented method for constructing an index structure for a card network system for international real-time payments, RTPs, between differing domestic RTP systems, the method performed by the card network system and comprising:

creating a first data record in the index structure for a first participating domestic RTP system, wherein the first participating domestic RTP system is associated with a first country;

storing a first country identifier in the first data record;

assigning a first primary account number (PAN) to the first participating domestic RTP system in the first data record; and publishing the first country identifier to allow other participating domestic RTP systems to select the first country to make an international real-time payment, wherein selection of the first country identifies the first PAN.

2. A system, comprising:

a card network system configured to construct an index structure for international real-time payments, RTPs, between differing domestic RTP systems, the card network system configured to:

create a first data record in the index structure for a first participating domestic RTP system, wherein the first participating domestic RTP system is associated with a first country;

store a first country identifier in the first data record;

assign a first primary account number (PAN), to the first participating domestic RTP system in the first data record; and publish the first country identifier to allow other participating domestic RTP systems to select the first country to make an international real-time payment, wherein selection of the first country identifies the first PAN, wherein the index structure comprises respective data records for each of the other participating domestic RTP systems, wherein each of the other participating domestic RTP systems is associated with other countries respectively, and wherein each of the other participating domestic RTP systems has a respective country identifier and a respective PAN stored in their respective data record.

3. The system of claim 2 further configured for an international real-time payment between a first domestic RTP system associated with a first country to a second domestic RTP system associated with a second country, wherein the first domestic RTP system and the second domestic RTP system are each participating domestic RTP systems in the card network system, wherein the card network system is configured to:

receive a payment request verification message from the first domestic RTP system to verify the account of a second user of the second domestic RTP system, wherein the payment request verification message comprises a PAN of the second domestic RTP system and a first identifier of the account of a first user of the first domestic RTP system and a second identifier of the account of the second user;

send the payment request verification message to the second domestic RTP system;

receive a payment request response message from the second domestic RTP system, wherein the payment request response message comprises an indication to confirm whether the second user account of the second domestic RTP system has been successfully verified or not; and send the payment request response message to the first domestic RTP system.

4. The system of claim 2 or 3 further configured for an international real-time payment between a first domestic RTP system associated with a first country to a second domestic RTP system associated with a second country, wherein the first domestic RTP system and the second domestic RTP system are each participating domestic RTP systems in the card network system, wherein the card network system is configured to:

receive a credit transfer request message from the first domestic RTP system, wherein the credit transfer request message comprises the PAN of the second domestic RTP system and the first identifier of the account of the first user and the second identifier of the account of the second user;

send the credit transfer request message to the second domestic RTP system;

receive a credit transfer response message from the second domestic RTP system, wherein the credit transfer response message comprises an indication to confirm whether the user account of the second domestic RTP system has been successfully credited or not; and send the credit transfer response message to the first domestic RTP system.

5. The system of claim 2, further comprising a first domestic RTP system configured to:

receive a first request message from an account of a first user of the first domestic RTP system to transfer funds to an account of a second user of a second domestic RTP system; and communicate with the card network system to complete the international real-time payment to the second user of the second domestic RTP system.

6. The system of claim 5, wherein to communicate with the card network system, the first domestic RTP system is configured to:

select a primary account number (PAN) of the second domestic RTP system from the index structure of the card network system, wherein selecting the PAN comprises identifying a country associated with the second domestic RTP system; and send a payment request verification message to the card network system to verify the account of the second user of the second domestic RTP system, wherein the payment request verification message comprises the PAN of the second domestic RTP system and a first identifier of the account of the first user and a second identifier of the account of the second user; and receive a payment request response message from the card network system, wherein the payment request response message comprises a first indication to confirm whether the account of the second user of the second domestic RTP system has been successfully verified or not.

7. The system of claim 6, wherein the first domestic RTP system comprises a first banking entity and a first proxy banking entity, wherein the first request message is received at the first banking entity, wherein the first banking entity comprises the account of the first user, and the first banking entity is configured to:

send the first request message to the first proxy banking entity, wherein the first proxy banking entity is configured to select the PAN of the second domestic RTP system from the index structure of the card network system, send the payment request verification message to the card network system, receive the payment request response message from the card network system, and send the payment request response message to the first banking entity.

8. The system of claim 7, wherein the first proxy banking entity is configured to retrieve exchange rate information for making the international real-time payment; and send the exchange rate information to the first banking entity.

9. The system of claim 5, wherein to communicate with the card network system, the first domestic RTP system is configured to:

send a credit transfer request message to the card network system, wherein the credit transfer request message comprises the PAN of the second domestic RTP system and the first identifier of the account of the first user and the second identifier of the account of a second user; and receive a credit transfer response message from the card network system, wherein the credit transfer response message comprises a second indication to confirm whether the user account of the second domestic RTP system has been successfully credited or not.

10. The system of claim 9, further comprising a first banking entity configured to:

send a credit transfer request message to a first proxy banking entity, wherein the first proxy banking entity is configured to send the credit transfer request message to the card network system, receive the credit transfer response message from the card network system, and send the credit transfer response message to the first banking entity.

11. The system of claim 10, wherein the first banking entity is configured to send a credit transfer confirmation message to the first user.

12. The system of claim 2, further comprising a second domestic RTP system configured to:

receive one or more messages from the first domestic RTP system via the card network system; and communicate with the card network system to complete the international real-time payment to a second user of the second domestic RTP system.

13. The system of claim 12, wherein the first domestic RTP system is configured to:

receive a payment request verification message from the card network system, wherein the payment request verification message comprises a primary account number (PAN) of the second domestic RTP system and a first identifier of the account of a first user of the first domestic RTP system and a second identifier of the account of a second user of the second domestic RTP system;

verify the account of the second user of the second domestic RTP system; and send a payment request response message to the card network system, wherein the payment request response message comprises a first indication to confirm whether the account of the second user of the second domestic RTP system has been successfully verified or not.

14. The system of claim 13, wherein the second domestic RTP system comprises a second banking entity and a second proxy banking entity, wherein the payment request verification message is received at the second proxy banking entity, and wherein the second proxy banking entity is configured to:

send the payment request verification message to the second banking entity, wherein the second banking entity comprises the account of the second user, wherein the second banking entity is configured to verify the account of the second user and send the payment request response message to the second proxy banking entity.

15. The system of claim 12 or 13, wherein the second domestic RTP system is configured to:

receive a credit transfer request message from the card network system, wherein the credit transfer request message comprises the PAN of the second domestic RTP system and the first identifier of the account of the first user of the first domestic RTP system and the second identifier of the account of the second user of the second domestic RTP system;

credit the account of the second user of the second domestic RTP system; and send a credit transfer response message to the card network system, wherein the credit transfer response message comprises a second indication to confirm whether the account of the second user of the second domestic RTP system has been successfully credited or not.

16. The system of claim 15, further comprising a second proxy banking entity configured to send the credit transfer request message to the second banking entity, wherein the second banking entity is configured to credit the account of the second user and send the credit transfer response message to the second proxy banking entity; and wherein the second proxy banking entity is configured to send the credit transfer response message to the card network system.

17. A non-transitory computer-readable medium storing instructions that are operable when executed by data processing apparatus of a participant in a secure communications system to:

create a first data record in an index structure for a first participating domestic RTP system, wherein the first participating domestic RTP system is associated with a first country;

store a first country identifier in the first data record;

assign a first primary account number (PAN) to the first participating domestic RTP system in the first data record; and publish the first country identifier to allow other participating domestic RTP systems to select the first country to make an international real-time payment, wherein selection of the first country identifies the first PAN, wherein the index structure comprises respective data records for each of the other participating domestic RTP systems, wherein each of the other participating domestic RTP systems is associated with other countries respectively, and wherein each of the other participating domestic RTP systems has a respective country identifier and a respective PAN stored in their respective data record.

* * * * *